US012580264B2

(12) United States Patent
Evans

(10) Patent No.: US 12,580,264 B2
(45) Date of Patent: Mar. 17, 2026

(54) BATTERY TRAY

(71) Applicant: Moment Energy Inc., Port Coquitlam (CA)

(72) Inventor: James Daniel Evans, Vancouver (CA)

(73) Assignee: Moment Energy Inc. (CA)

( * ) Notice: Subject to any disclaimer, the term of this patent is extended or adjusted under 35 U.S.C. 154(b) by 580 days.

(21) Appl. No.: 17/990,266

(22) Filed: Nov. 18, 2022

(65) Prior Publication Data

US 2024/0170784 A1      May 23, 2024

(51) Int. Cl.
*H01M 50/249* (2021.01)
*A47B 81/00* (2006.01)
*H01M 50/204* (2021.01)

(52) U.S. Cl.
CPC ........... *H01M 50/249* (2021.01); *A47B 81/00* (2013.01); *H01M 50/204* (2021.01); *H01M 2220/20* (2013.01)

(58) Field of Classification Search
CPC ............. H01M 50/204; H01M 50/249; H01M 2220/20; A47B 81/00; A47F 7/00
See application file for complete search history.

(56) References Cited

U.S. PATENT DOCUMENTS

| | | | | |
|---|---|---|---|---|
| 4,270,661 A * | 6/1981 | Rosenband | ............... | A47F 1/12 211/191 |
| 4,518,088 A * | 5/1985 | Passoni | ................. | H01M 50/00 211/175 |

| | | | | |
|---|---|---|---|---|
| 5,403,679 A * | 4/1995 | Stone | ................... | H01M 50/204 429/100 |
| 5,593,048 A * | 1/1997 | Johnson | ..................... | A47F 1/04 211/184 |
| 5,890,606 A * | 4/1999 | Kuipers | .............. | H01M 50/271 211/186 |
| 6,257,427 B1 * | 7/2001 | Schneid | .............. | A47B 47/028 211/189 |
| 6,310,783 B1 * | 10/2001 | Winch | .................. | H02J 7/0029 361/679.48 |
| 6,451,475 B1 * | 9/2002 | Sherwood | ........... | H01M 50/204 429/96 |
| 6,475,659 B1 * | 11/2002 | Heimer | ............... | H01M 10/627 429/204 |
| 6,482,541 B1 * | 11/2002 | Bator, Jr. | ............ | H01M 50/224 429/96 |
| 6,629,737 B2 * | 10/2003 | Wiggins | ................. | A47B 57/58 180/68.5 |
| 6,638,660 B2 * | 10/2003 | Stone | .................. | H01M 50/209 429/100 |

(Continued)

*Primary Examiner* — Stanton L Krycinski
(74) *Attorney, Agent, or Firm* — Foley & Lardner LLP

(57) ABSTRACT

A battery tray can include a first member having a first lower portion and a first upper portion. The first lower portion can support a battery with a first insulative element positioned between the first lower portion and the battery. The first upper portion can couple with the battery with a second insulative element positioned between the battery and the first upper portion. The battery tray can include a second member having a second lower portion and a second upper portion. The second lower portion can support the battery with a third insulative element positioned between the second lower portion and the battery. The second upper portion can couple with the battery with a fourth insulative element positioned between the battery and the second upper portion.

20 Claims, 8 Drawing Sheets

(56)  References Cited

U.S. PATENT DOCUMENTS

| 6,719,150 B2 * | 4/2004 | Marraffa | H01M 50/264 |
| | | | 211/49.1 |
| 6,936,372 B1 * | 8/2005 | Jagota | H01M 10/48 |
| | | | 429/50 |
| 7,124,771 B2 * | 10/2006 | Frazier | G01M 3/186 |
| | | | 220/571 |
| 7,323,271 B2 * | 1/2008 | Marraffa | H01M 50/204 |
| | | | 429/100 |
| 7,479,346 B1 | 1/2009 | Chow et al. | |
| 7,548,429 B2 * | 6/2009 | Miller | H01M 10/627 |
| | | | 429/96 |
| 7,575,828 B2 * | 8/2009 | Marraffa | H01M 10/627 |
| | | | 429/96 |
| 7,602,145 B2 | 10/2009 | Renda | |
| 7,691,526 B2 * | 4/2010 | Frazier | G01M 3/04 |
| | | | 429/96 |
| 7,723,955 B2 | 5/2010 | Zaag et al. | |
| 7,740,142 B2 | 6/2010 | Miller et al. | |
| 8,598,884 B2 * | 12/2013 | Yano | H01M 10/486 |
| | | | 320/132 |
| 8,686,693 B2 | 4/2014 | Bhowmik et al. | |
| 8,872,474 B2 * | 10/2014 | Scheucher | B60L 53/11 |
| | | | 320/112 |
| 8,963,499 B2 | 2/2015 | Choi | |
| 9,077,181 B2 | 7/2015 | Schlaupitz et al. | |
| 9,112,205 B2 | 8/2015 | Conrardy et al. | |
| 9,148,029 B2 | 9/2015 | Tsai | |
| 9,172,259 B2 | 10/2015 | Hwang | |
| 9,236,749 B2 | 1/2016 | Gibbs et al. | |
| 9,277,298 B2 | 3/2016 | Yang et al. | |
| 9,300,016 B2 | 3/2016 | Yun | |
| 9,331,497 B2 | 5/2016 | Beaston | |
| 9,437,860 B2 * | 9/2016 | Farha | H01M 50/507 |
| 9,455,580 B2 | 9/2016 | Mao et al. | |
| 9,488,977 B2 | 11/2016 | Cho et al. | |
| 9,641,013 B2 | 5/2017 | Lee et al. | |
| 9,705,340 B2 | 7/2017 | Lucea | |
| 9,755,200 B2 | 9/2017 | Conrardy et al. | |
| 9,847,654 B2 | 12/2017 | Beaston | |
| 10,153,624 B2 | 12/2018 | Park et al. | |
| 10,181,733 B2 | 1/2019 | Jo | |
| 10,193,112 B2 | 1/2019 | Zimbru et al. | |
| 10,283,974 B2 | 5/2019 | Macris | |
| 10,439,372 B2 | 10/2019 | Chen et al. | |
| 10,894,498 B2 | 1/2021 | Lee et al. | |
| 10,938,018 B2 * | 3/2021 | Motokawa | H01M 50/572 |
| 11,322,793 B2 * | 5/2022 | Shimizu | H01M 50/502 |
| 11,383,617 B2 | 7/2022 | Woeste et al. | |
| 11,431,052 B2 * | 8/2022 | Bende | H01G 2/10 |
| 11,522,245 B2 | 12/2022 | Lee et al. | |
| 11,581,593 B2 * | 2/2023 | Lee | H01M 10/653 |
| 11,688,904 B2 * | 6/2023 | Koepele | H01M 10/625 |
| | | | 429/120 |
| 11,699,909 B1 | 7/2023 | Kahn et al. | |
| 11,831,192 B2 | 11/2023 | Kahn et al. | |
| 12,224,447 B2 * | 2/2025 | Bradwell | H01M 50/183 |
| 12,243,995 B2 * | 3/2025 | Menzl | H01M 10/6554 |
| 2003/0003350 A1 * | 1/2003 | Heimer | H01M 50/253 |
| | | | 429/97 |
| 2004/0079714 A1 * | 4/2004 | Andrew | H01M 50/209 |
| | | | 211/49.1 |
| 2007/0278915 A1 * | 12/2007 | Conrardy | H01M 50/262 |
| | | | 29/729 |
| 2008/0093958 A1 * | 4/2008 | Peterson | H04Q 1/064 |
| | | | 312/223.1 |
| 2017/0133642 A1 * | 5/2017 | Lee | H01M 50/50 |
| 2019/0097280 A1 | 3/2019 | You et al. | |
| 2020/0313129 A1 * | 10/2020 | Koutari | H01M 50/3425 |
| 2020/0358127 A1 * | 11/2020 | Terauchi | H01M 10/613 |
| 2021/0273278 A1 * | 9/2021 | Yoshida | B60L 50/64 |
| 2022/0278389 A1 * | 9/2022 | Chi | H01M 10/625 |
| 2022/0285779 A1 | 9/2022 | Kim et al. | |
| 2022/0294051 A1 | 9/2022 | Kim et al. | |
| 2022/0311255 A1 | 9/2022 | Lim | |
| 2022/0359922 A1 * | 11/2022 | Park | H01M 50/298 |
| 2023/0011587 A1 * | 1/2023 | Yoon | H01M 10/625 |
| 2023/0040296 A1 | 2/2023 | Jeong et al. | |
| 2023/0050428 A1 | 2/2023 | Lee et al. | |
| 2023/0071601 A1 * | 3/2023 | Singer | H01M 10/425 |
| 2023/0072733 A1 * | 3/2023 | Yokoyama | H01M 10/6562 |
| 2023/0148088 A1 | 5/2023 | Lee et al. | |
| 2023/0253803 A1 | 8/2023 | Kahn et al. | |
| 2024/0088700 A1 | 3/2024 | Kahn et al. | |
| 2024/0170767 A1 * | 5/2024 | Boddakayala | H01M 10/625 |
| 2024/0297394 A1 * | 9/2024 | Yoon | H01M 50/293 |
| 2025/0015389 A1 * | 1/2025 | Seo | H01M 50/211 |

* cited by examiner

600

Provide first member — 605

Provide second member — 610

Provide battery — 615

Couple first member — 620

Couple second member — 625

Insert tray — 630

700

Provide battery tray ~ 705

800

Provide battery energy storage system    ~ 805

BATTERY TRAY

BACKGROUND

Electric power can be provided to buildings, equipment, or other devices. Batteries can store electric power.

SUMMARY

Battery energy storage systems can include at least one rechargeable battery to provide power to a device or system (e.g., a building, medical equipment, manufacturing equipment, or other system) or to receive or store power from a device or system (e.g., a solar panel, a windmill, or other energy harvesting device). The battery energy storage system can include at least one tray positioned within an interior cavity of a cabinet. The tray can be slidably coupled with a frame of the cabinet. The tray can include a first member and a second member, the first and second members to support the battery within the cabinet. The tray can include at least one insulative element. For example, the tray can include a first insulative element positioned between the battery and the first member of the tray and second insulative element positioned between the second member and the tray. The insulative members can electrically isolate the battery from the first member, the second member, the tray, the frame of the cabinet, or the cabinet.

At least one aspect is directed to an apparatus. The apparatus can be a battery tray. The battery tray can include a first member having a first lower portion and a first upper portion. The first lower portion can support a battery with a first insulative element positioned between the first lower portion and the battery. The first upper portion can couple with the battery with a second insulative element positioned between the battery and the first upper portion. The battery tray can include a second member having a second lower portion and a second upper portion. The second lower portion can support the battery with a third insulative element positioned between the second lower portion and the battery. The second upper portion can couple with the battery with a fourth insulative element positioned between the battery and the second upper portion.

At least one aspect is directed to a system. The system can be a battery energy storage system. The battery energy storage system can include an enclosure defining an interior space and a frame within the interior space of the enclosure. The frame can be structured to receive a battery tray supporting a battery. The battery tray can include a first member coupled with the battery and a first insulative element positioned between the first member and the battery to electrically isolate the battery from the frame. The battery tray can include a second member coupled with the battery and a second insulative element positioned between the second member and the battery to electrically isolate the battery from the frame.

At least one aspect is directed to a method. The method can include providing a first member, where the first member can including a first electrically-insulative element. The method can include providing a second member, where the second member can include a second electrically-insulative element. The method can include coupling a battery with the first member with the first electrically-insulative element positioned between the battery and the first member to electrically insulate the battery from the first member. The method can include coupling the battery with the second member with the second electrically-insulative element positioned between the battery and the second member.

At least one aspect is directed to a method of providing a battery tray. The battery tray can include a first member having a first lower portion and a first upper portion. The first lower portion can support a battery with a first insulative element positioned between the first lower portion and the battery. The first upper portion can couple with the battery with a second insulative element positioned between the battery and the first upper portion. The battery tray can include a second member having a second lower portion and a second upper portion. The second lower portion can support the battery with a third insulative element positioned between the second lower portion and the battery. The second upper portion can couple with the battery with a fourth insulative element positioned between the battery and the second upper portion.

At least one aspect is directed to a method of providing a battery energy storage system. The battery energy storage system can include an enclosure defining an interior space and a frame within the interior space of the enclosure. The frame can be structured to receive a battery tray supporting a battery. The battery tray can include a first member coupled with the battery and a first insulative element positioned between the first member and the battery to electrically isolate the battery from the frame. The battery tray can include a second member coupled with the battery and a second insulative element positioned between the second member and the battery to electrically isolate the battery from the frame.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of energy storage. The various concepts introduced above and discussed in greater detail below may be implemented in any of numerous ways.

The present disclosure is directed to energy storage systems, such as battery energy storage systems and related apparatuses and methods. Battery energy storage systems can include a cabinet defining an interior to house at least one battery. The battery can be rechargeable a battery, such as a battery having a lithium-based chemistry, a nickel-based chemistry, or other chemistry. The battery can include a battery from an electric vehicle. For example, the battery can include a second-life electric vehicle battery that has been removed from an electric vehicle after its useful life in said electric vehicle. The battery energy storage system can include at least one tray positioned within the interior of the cabinet. The tray can be slidably coupled with the cabinet. The battery can be coupled with the tray such that the battery is slidably coupled with the cabinet. The battery energy storage system can house a battery to store electrical energy from a power source (e.g., an energy-generating device such as a windmill) and to provide electrical energy to another device or system (e.g., a building, a car, medical equipment, or other device or system).

The disclosed solutions have a technical advantage of electrically insulating the battery from the battery energy storage system. For example, the battery energy storage system can include at least one insulative member positioned between the battery and the battery tray to electrically insulate the battery from the battery tray. The battery can be electrically insulated from the battery energy storage system with the battery electrically insulated from the battery tray. The insulative member can be or include an electrically insulative material such as ethylene propylene diene monomer (EPDM) rubber, Teflon, plastic, or some other electrically insulative material. The battery energy storage system can include multiple insulative members positioned between the battery and the first member of the tray and multiple insulative members positioned between the second member of the tray. For example, a first insulative member can be positioned between the battery and a first lower portion of the first member. A second insulative member can be positioned between the battery and the first upper portion of the first member. A third insulative member can be positioned between the battery and the second lower portion of the second member. A fourth insulative member can be positioned between the battery and the second upper portion of the second member. At least one insulative member can be positioned between the battery and the tray such that no portion of the battery contacts the tray directly.

Figure 1:
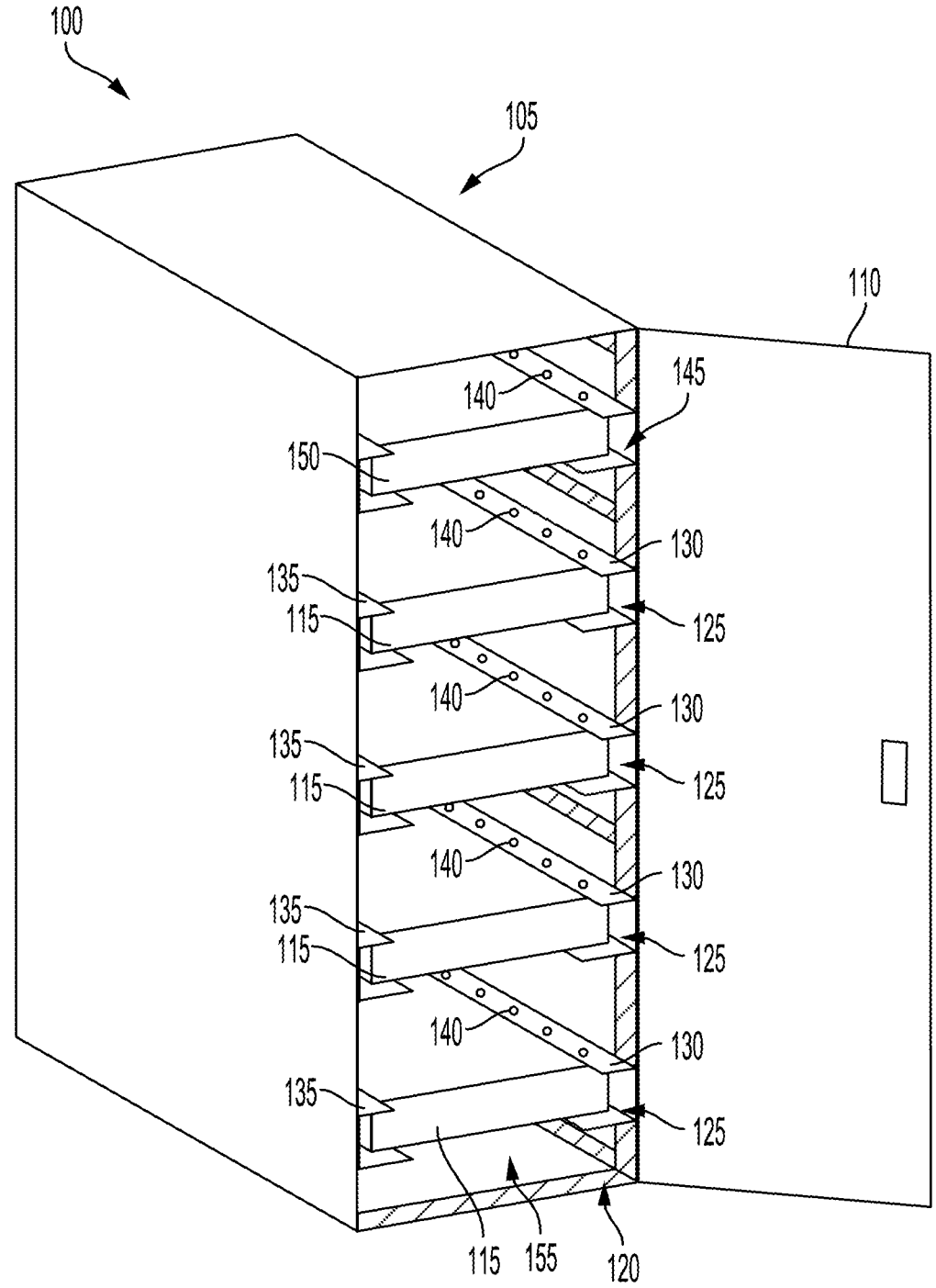
FIG. 1 depicts an example battery energy storage system, in accordance with some aspects.
Figure 2:
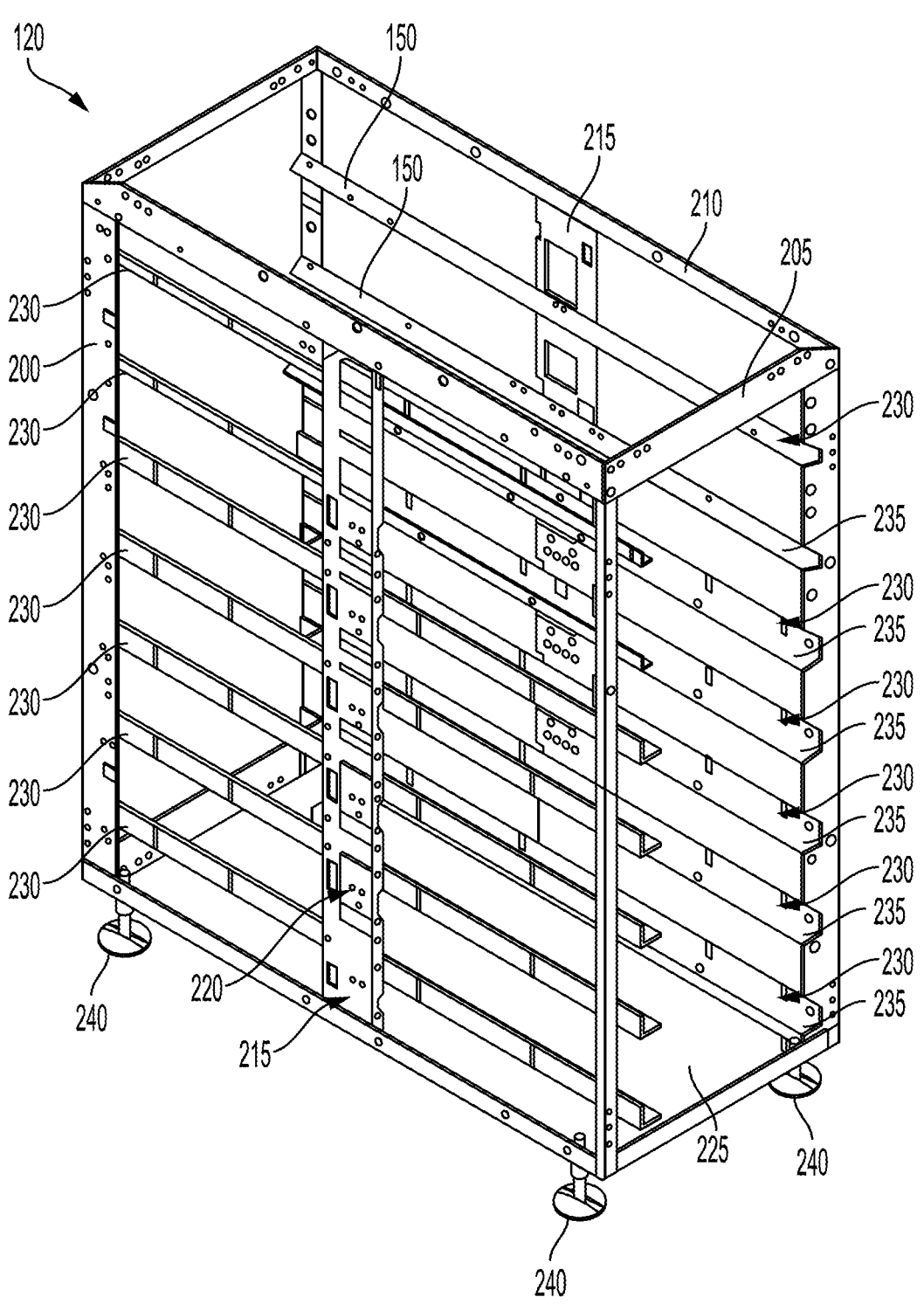
FIG. 2 depicts an example frame for a battery energy storage system, in accordance with some aspects.

FIGS. 1 and 2, among others, depict a battery energy storage system 100. For example, the battery energy storage system 100 can include a cabinet 105, a frame 120, at least one battery tray 125, at least one auxiliary tray 145, and at least one battery 115. The cabinet 105 can define a cavity 155. For example, the cabinet 105 can include a plurality of walls that define and enclose the cavity 155. The cabinet 105 can include a door 110 that is moveable (e.g., rotatable, pivotable, slidable, removable) to provide access to the cavity 155. For example, the door 110 can be hingedly coupled with the cabinet 105 to provide selective access to the cavity 155 with the door 110 in an open position. The cabinet 105 can include a parallelepiped form factor, a pentagonal form factor, a prismatic form factor, a cylindrical form factor, or some other form factor. For example, the cabinet 105 can include a parallelepiped form factor with the cavity also including a parallelepiped form factor, as is depicted in FIG. 1, among others.

The cabinet 105 can include a metal (e.g., steel, aluminum, or other metal) material composition, a composite material composition, a polymeric material composition, or some other material composition. The cabinet 105 can be or include a corrosion-resistant material or coating. For example, the cabinet 105 can be heat-treated, painted, powder coated, or otherwise coated with a corrosion-resistant material such that the cabinet 105 can resist weather elements (e.g., rain, snow, extreme temperatures, or other elements). The cabinet 105 can include casters, wheels, rollers, tracks, or some other mechanism to facilitate a movement of the cabinet 105. For example, the cabinet 105 can include a plurality of wheels mounted on a bottom of the cabinet 105 to facilitate the movement of the cabinet 105 along a ground surface such that the battery energy storage system 100 can be portable or semi-portable.

The frame 120 of the battery energy storage system 100 can be positioned within the cavity 155 defined by the cabinet 105. For example, the frame 120 can include a plurality of frame members to define a form factor of the cabinet 105. The cabinet 105 can include at least one panel (e.g., a top panel, a side panel, a bottom panel) that is coupled with the frame 120 to form the cabinet 105. For example, the frame 120 can be a frame around which the cabinet 105 is formed or to which one or more panels of the cabinet 105 are coupled. The frame 120 can include a parallelepiped form factor, or a pentagonal form factor, a prismatic form factor, a cylindrical form factor, or some other form factor. For example, the frame 120 can include a form factor that is the same as or substantially similar to (e.g., ±95% similar) to the form factor of the cabinet 105.

As depicted in FIG. 2, among others, the frame 120 can include at least one first member 200, at least one second member 205, at least one third member 210, and a base 225. For example, the first member 200 can be or include a vertical post or slender member oriented in a vertical direction (e.g., extending upwards from a ground surface, extending in a direction having vertical component, extending along a Z-axis). The frame 120 can include four first members 200. For example, if the cabinet 105 or the frame 120 includes a parallelepiped form factor, the frame 120 can include four first members 200 positioned at each of four corners of the frame 120 and oriented in a vertical direction. The second member 205 can include or include a horizontal post or slender member oriented in a first horizontal direction (e.g., extending from a first side to a second side, extending along an X-axis). For example, the frame 120 can include four second members 205 positioned in a horizontal orientation at a top and bottom of both a front side and a rear side of the frame 120 with the frame 120 or the cabinet 105 having a parallelepiped form factor. The third member 210 can be or include a horizontal post or slender member oriented in a second horizontal direction (e.g., extending from the front side to the rear side of the frame 120, extending along a Y-axis). For example, the frame 120 can include four third members 210 positioned in a horizontal orientation at a top and bottom of both the first side and the second side of the frame 120 with the frame 120 or the cabinet 105 having a parallelepiped form factor. The base 225 can be a bottom member of the frame 120, cabinet 105, or battery energy storage system 100. For example, the base 225 can be a plate or other member that extends between two second members 205 and two third members 210 to define a horizontal surface. The base 225 can be coupled with at least one second member 205, at least one third member 210, or at least one first member 200. The base 225 can be part of the cabinet 105, for example.

The frame 120 can include at least one spine member 215. For example, the frame 120 can include a spine member 215 positioned between two first members 200 and extending in a vertical direction (e.g., in a direction having a vertical component, a direction parallel to at least one first member 200). As depicted in FIG. 2, the frame 120 can include two spine members 215, one on a first side of the frame 120 and the other on a second side of the frame 120. The spine member 215 can define a passage 220 extending along at least a portion of the spine member 215. For example, the spine member 215 can define a passage 220 that extends from a first point proximate a top of the frame 120 to a second point proximate a bottom of the frame 120. The spine member 215 can define at least one opening. For example, the spine member 215 can define an opening to allow an object (e.g., an electrical wire, a coolant line, or some other object) to extend from within the passage into the cavity 155 of the cabinet 105. The spine member 215 can define a plurality of openings positioned along the length of the spine member 215, with each opening providing access from the cavity 155 to the passage 220 or from the passage 220 to the cavity 155.

The frame 120 can include the first member 200, the second member 205, the third member 210, and the spine member 215 coupled together. For example, each of the first members 200, second members 205, third members 210, or spine members 215 of the frame 120 can be coupled with at least one other first member 200, second member 205, third member 210, or spine member 215. The first member 200, second member 205, third member 210, and spine member 215 can include at least one fastener (e.g., a screw, bolt, rivet, or other fastener) or aperture to receive a fastener that can correspond to an aperture to receive a fastener or a fastener of another first member 200, second member 205, third member 210, or spine member 215. For example, the first member 200 can include an aperture to receive a fastener of the second member 205 and the third member 210 to form a corner of the frame 120.

The battery energy storage system 100 can include the frame 120 including at least one rail 230. For example, the frame 120 of the battery energy storage system 100 can include a plurality of rails 230 extending parallel to the third member 210 and extending from a front of the frame 120 to a rear of the frame 120. The battery energy storage system 100 can include the rails 230 to support a tray, such as a battery tray 125 or an auxiliary tray 145. For example, the frame 120 can include a plurality of pairs of rails 230 to support a plurality of battery trays 125 and at least one pair of rails 230 to support an auxiliary tray 145. The pairs of rails 230 can be arranged such that a first rail 230 is positioned at or proximate (e.g., within two centimeters of, within five centimeters of) a first side (e.g., a right side) of the frame 120 and a second rail 230 is positioned at or proximate to (e.g., within two centimeters of, within five centimeters of) a second side (e.g., a left side) of the frame 120. The first rail 230 and the second rail 230 can be positioned parallel with each other and within a horizontal plane or a substantially horizontal plane (e.g., ±15° from horizontal). For example, the frame 120 can include a multiple pairs of rails 230 spaced apart along the frame 120, with each pair of rails 230 positioned within a plane that is parallel or substantially parallel (e.g., ±15° from parallel) planes defined by each other pair of rails 230.

The battery energy storage system 100 can include the rail 230 coupled with the first member 200 of the frame 120. For example, the first member 200 can extend in a generally vertical direction, as discussed above. The rail 230 can be coupled with the first member 200 with the rail 230 extending perpendicular or substantially perpendicular (e.g., ±15° from perpendicular) with the first member 200. The rail 230 can be coupled with two or more first members 200. For example, the rail 230 can be coupled with a first first member 200 defining a front of the frame 120. The same rail 230 can also be coupled with a second first member 200 defining a rear of the frame 12. For example, the rail 230 can extend from a front of the frame 120 to a rear of the frame 120 with the rail 230 coupled with two first members 200. The first member 200 can include at least one fastener (e.g., a bolt, screw, rivet, or other fastener) or can define at least one aperture to receive a fastener. For example, the rail 230 can receive the fastener of the first member 200, or a fastener (e.g., bolt, screw, rivet, or other fastener) of the rail 230 can be received by the aperture of the first member 200. The rail 230 can be coupled with a spine member 215. For example, a spine member 215 can be positioned along a side (e.g., a first side, a right side, a second side, a left side) of the frame 120 between two first members 200, as depicted in FIG. 2. The rail 230 can extend perpendicularly or substantially perpendicularly (e.g., ±15° from perpendicular) from the spine member 215. The spine member 215 can include a fastener or can define an aperture to receive a fastener of the rail 230. The rail 230 can be coupled with a second member 205, a third member 210, or some other member.

The rail 230 can include or define a lip, edge, or surface 235. For example, the rail 230 can define a horizontal surface 235 or a substantially horizontal surface (e.g., ±15° from horizontal or ±15° from parallel with the base 225) that extends from the first member 200 or the spine member 215 towards a center of the cavity 155. The rail 230 can define the surface 235 extending from the first member 200 or the spine member 215 inwards towards a center of the cabinet 105. The surface 235 can extend from a front of the frame 120 to a rear of the frame 120. The surface 235 can extend from the first member 200 for a distance (e.g., two or more centimeters, five or more centimeters, ten or more centimeters, or some other distance). The surface 235 can be rigidly coupled with the frame 120 such that the surface 235 can support a weight (e.g., ten kilograms, fifty kilograms, one hundred kilograms, or more than one hundred kilograms). For example, the rail 230 can be or include an angle iron or slender member having an L-shaped cross-sectional shape such that a portion of the cross-sectional shape of the rail 230 extends parallel the first member 200 with the surface 235 extending perpendicular to the first member 200. The battery energy storage system 100 can include the surface 235 of the rail 230 to support a battery 115 or a battery tray 125 coupled with a battery 115. For example, as discussed in detail below, surface 235 of the rail 230 can support a battery tray 125 that is coupled with a battery 115.

The frame 120 can include at least one leveling device 240. For example, as depicted in FIG. 2, among others, the frame 120 can include a multiple leveling devices 240. The leveling device 240 can be positioned underneath the frame 120 (e.g., beneath the base 225) to support the frame 120 on a ground surface. For example, the leveling device 240 can be positioned between the frame 120 (and the cabinet 105 and a battery 115 positioned within the cavity 155 of the cabinet 105) and a ground surface to support the battery energy storage system 100. The leveling device 240 can extend from the frame 120 towards a ground surface (e.g., in a downwards direction). The leveling device 240 can extend from the frame 120 towards the ground surface at a variable distance. For example, the leveling device 240 can include a threaded post, a hydraulically or pneumaticallyoperated post that can extend or retract the leveling device 240 with respect to the frame 120 to alter a distance at which the leveling device 240 extends from the frame 120. The battery energy storage system 100 can include multiple leveling devices 240 (e.g., one positioned at or proximate to (e.g., within ten centimeters of) a corner of the frame 120. Each of the multiple leveling devices 240 can extend from the frame 120 at a different distance. For example, each of the leveling devices 240 can extend from the frame 120 at a specific distance in order to level the frame 120, the cabinet 105, or a battery 115 within the cavity 155 of the cabinet 105 with respect to a horizontal plane. Because the battery energy storage system 100 can be placed on an uneven or non-level surface, the leveling devices 240 can support the frame 120 with the frame 120, the cabinet 105, or a battery 115 within the cavity 155 of the cabinet 105 in a substantially level (e.g., ±15° from level) orientation.

Figure 3:
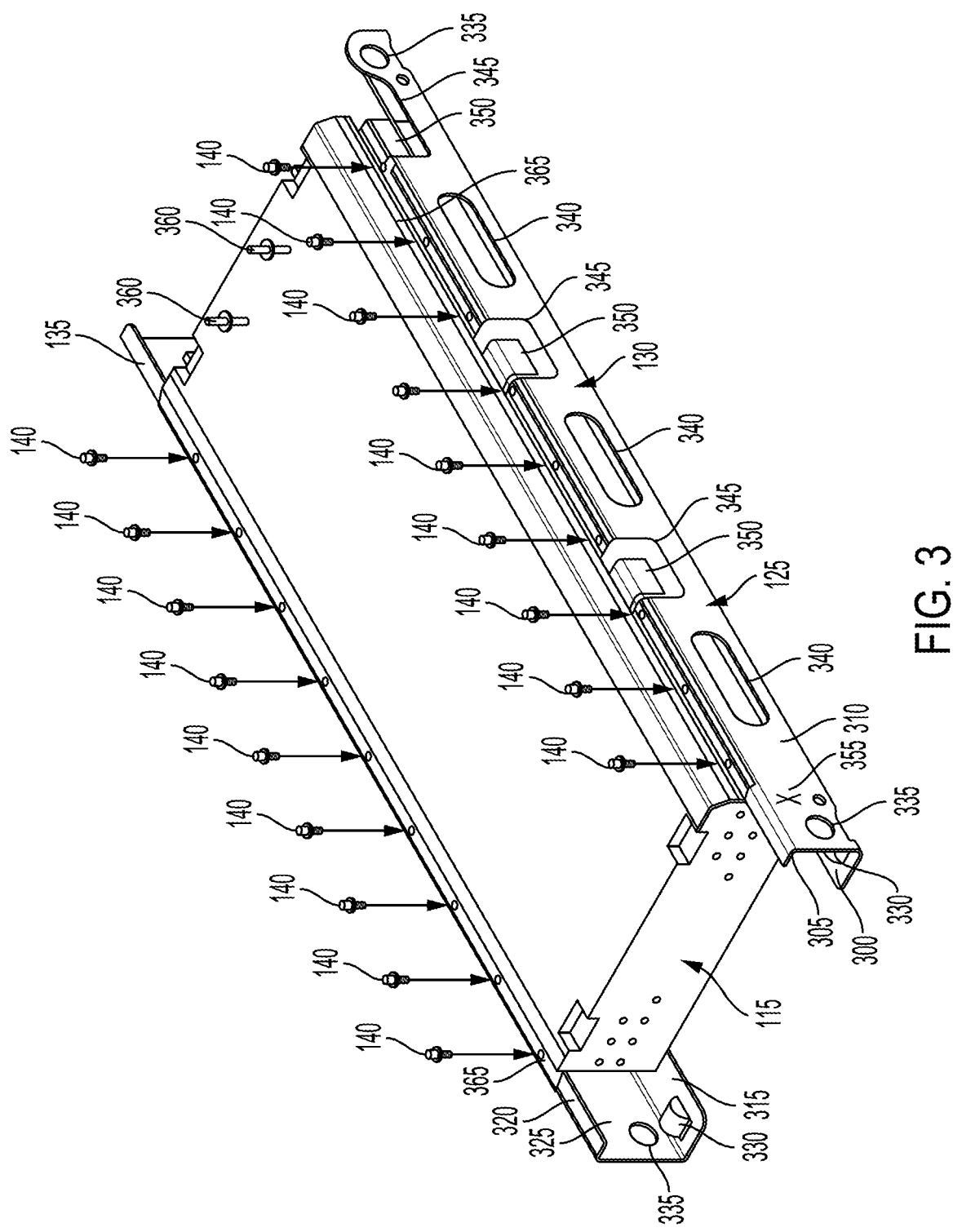
FIG. 3 depicts an example battery tray for a battery energy storage system, in accordance with some aspects.

As depicted in FIG. 3, among others, the battery energy storage system 100 can include at least one battery 115. The battery 115 can be a single battery (e.g., a single battery cell), a battery module (e.g., a group of battery cells), or a battery pack (e.g., a group of battery modules or a group of battery cells). The battery 115 can be a battery cell, battery module, or battery pack from an electric vehicle. For example, the battery 115 can be used during a first life application as an energy source or energy storage means for an electric vehicle such as an electric car, truck, semi-truck, on-highway machine, off-highway machine, or other vehicle. The battery 115 can be a battery cell, module, or pack from some other application. The battery 115 can be a new battery, a used (e.g., previously used in another application), a reconditioned battery, or a battery in some other state. The battery 115 can be a lithium ion (Li-On) battery, a nickel-metal hydride (NiMH) battery, lead acid (SLA) battery, a solid state battery, a or some other type of energy storage device.

Figure 5:
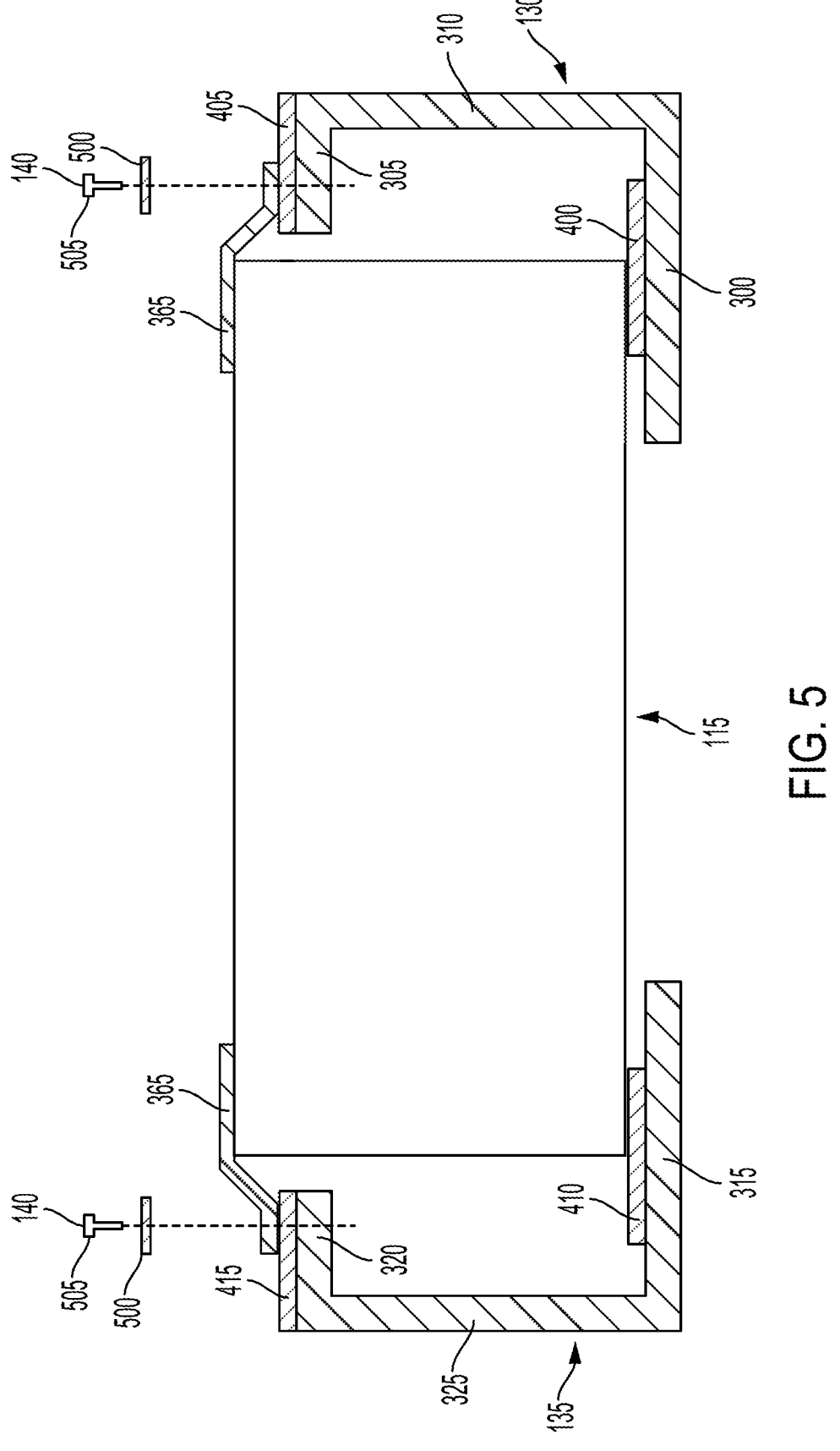
FIG. 5 depicts an example battery tray for a battery energy storage system, in accordance with some aspects.

The battery 115 can include at least one mounting flange 365. For example, the battery can include a first mounting flange 365 coupled with a top of the battery and positioned at or proximate to (e.g., within two centimeters of, within five centimeters of, or within some other distance of) a first side of the battery 115. The battery 115 can include a second mounting flange 365 coupled with the top of the battery and positioned at or proximate to (e.g., within two centimeters of, within five centimeters of, or within some other distance of) a second side of the battery 115. The mounting flange 365 can extend outwards from the top of the battery 115 to a respective side of the battery 115. As depicted in FIGS. 3 and 5, the first mounting flange 365 can extend from the top of the battery 115 in a first direction (e.g., to the right or to the left, as shown) and the second mounting flange 365 can extend from the top of the battery 115 in a second direction (e.g., to the left or to the right, as shown). As depicted in FIG. 3, among others, the mounting flange 365 can define a plurality of apertures. The plurality of apertures can receive a plurality of fasteners (e.g., fasteners 140) to secure the battery 115 to another object. For example, the mounting flange 365 can receive at least one fastener to secure or couple the battery 115 to a battery tray 125. The mounting flange 365 can be coupled with or integrated with the battery 115. For example, the battery 115 can include the mounting flange 365, where the mounting flange 365 can include a dimension, form factor, material composition, or other feature to couple the battery 115 with an electric vehicle in a first application (e.g., in the case where use in the battery energy storage system 100 is a second-life application for the battery 115).

The battery 115 can include at least one connector 350. For example, the battery 115 can include at least one electrical connector 350 to electrically couple the battery 115 with another device, system, or at least one electrical wire (e.g., a wiring harness). For example, the battery 115 can include an electrical connector 350 to electrically couple the battery 115 with the battery energy storage system 100 to provide the electrical energy stored within the battery 115 to the battery energy storage system 100. The battery energy storage system 100 can be electrically coupled with the battery 115 via at least one electrical wire or a wiring harness to draw electrical power from the battery 115 or to provide electrical power to the battery 115. For example, the battery energy storage system 100 can draw electrical energy from the battery 115 to provide electrical energy to another device or system (e.g., a building, medical equipment, manufacturing equipment, or other equipment). The battery 115 can include multiple connectors 350. The battery energy storage system 100 can include multiple electrical wires or wiring harnesses to electrically couple the battery energy storage system 100 with multiple batteries 115. At least one of the electrical wires or wiring harnesses can be coupled with the batteries 115 via the passage 220 of the spine member 215.

The battery 115 can include at least one cooling port 360. For example, the battery 115 can include a cooling inlet port 360 and a cooling outlet port 360. The cooling inlet port 360 can receive coolant to provide cooling energy to the battery 115. For example, the battery 115 can include at least one cooling conduit or passageway within the battery 115 that can facilitate a flow of coolant (e.g., water, ethylene glycol, or some other cooling fluid) through the battery 115 or around the battery 115 to reduce a temperature of the battery 115. Coolant can be received from a cooling device (as discussed below) via the cooling inlet port 360. Coolant can be exit the cooling conduit or passageway via the cooling outlet port 360. The cooling outlet port 360 can be fluidly coupled with a cooling device to provide used coolant to the cooling device, for example.

The battery energy storage system 100 can include at least one auxiliary tray 145. For example, the battery energy storage system 100 can include the auxiliary tray 145 to support an auxiliary device 150. The auxiliary device 150 can be a cooling device or a control device. The battery energy storage system 100 can include the auxiliary tray 145 to support an electronic control device. For example, the battery energy storage system 100 can include an auxiliary tray 145 to support a cooling device to provide cooling energy to the battery 115 or the cavity 155 of the cabinet 105. The cooling device can circulate coolant, air, or some other fluid to cool the battery 115 or any other component within the cavity 155 of the cabinet 105. For example, the cooling device can circulate coolant to a battery 115. The cooling device can be fluidly coupled with at least one coolant port 360 of the battery 115 to provide coolant (e.g., a cooling fluid such as water, ethylene glycol, or some other fluid) to the battery 115. For example, the cooling device can circulate coolant through cooling elements within the battery via the cooling port 360 to reduce a temperature of the battery 115. At least one fluid conduit can extend from the cooling device supported by the auxiliary tray (or otherwise positioned within or without the cavity 155 of the cabinet 105) to at least one battery 115. For example, an inlet fluid conduit can extend from the cooling device to the cooling inlet port 360 and an outlet fluid conduit can extend from the cooling device to the cooling outlet port 360. The fluid conduit (e.g., the inlet fluid conduit or the outlet fluid conduit) can be extend from the cooling device to the battery 115 via the passage 220 of the spine member 215.

The auxiliary tray 145 can support a control device. For example, the auxiliary tray can support a control device configured to control the operation of the battery energy storage system 100. The control device could be a computing system, a controller, or some other device configured to communicate with the battery 115 of the battery energy storage system 100 and other devices communicably coupled with the battery energy storage system 100 (e.g., a device receiving a charge from the battery energy storage system 100). The control device can be configured to determine, among other things, whether the frame 120 or some other portion of the cabinet 105 becomes incidentally energized by a battery 115 or by a device electrically coupled with the battery energy storage system 100. For example, the control device can disconnect a the battery (e.g., sever an electrical connection with the battery) or can command the battery 115 to cease providing electrical energy in response to a determination that the frame 120 or other component of the battery energy storage system 100 becomes energized or potentially energized in advertently.

The auxiliary tray 145 can be supported by a surface 235 of at least one rail 230 of the frame 120. For example, the auxiliary tray 145 can include at least one roller or rolling element that can be slidably received by the rail 230 of the frame such that the auxiliary tray 145 can be slid into or out of the cavity 155 of the cabinet 105. The auxiliary tray 145 can be supported by a surface 235 of each of two rails 230, where the rails 230 collectively define a horizontal or substantially horizontal (e.g., ±15° from horizontal) surface. The battery energy storage system 100 can include two or more auxiliary trays 145. For example, the battery energy storage system 100 can include a first auxiliary tray 145 to support the cooling device or other components and a second auxiliary tray 145 to support the control device or other components.

The battery energy storage system 100 can include at least one battery tray 125. For example, the battery energy storage system 100 can include a battery tray 125 to support a battery 115 with the battery tray 125 within the cavity 155 of the cabinet 105. At least one rail 230 of the frame 120 can support the battery tray 125. For example, the rail 230 can include or define the horizontal surface 235 extending from the first member 200 or the spine member 215 of the frame 120 towards a center of the cavity 155. The surface 235 can extend from the first member 200 or the spine member 215 at a distance (e.g., five centimeters, more than five centimeters, less than five centimeters). The battery tray 125 can be supported by the surface 235 of the rail 230 with the rail 230 coupled with the first member 200 or other member (e.g., spine member 215, second member 205, third member 210, or some other member of the frame 120). The battery tray 125 can be supported by two rails 230. For example, the surfaces 235 of a pair of rails 230 can support the battery tray 125. A first side of the battery tray 125 can be supported by a first surface 235 of the first rail 230 of the pair of rails 230. A second side of the battery tray 125 can be supported by a second surface 235 of the second rail 230 of the pair of rails 230.

The battery energy storage system 100 can include the battery tray 125 to support a battery 115. For example, the battery energy storage system 100 can include a tray 125 to support a battery 115 with the tray 125 positioned within the cavity 155 of the cabinet 105. The tray 125 can support the battery 115 with the battery tray 125 supported by a surface 235 of a rail 230. The battery tray 125 can support the battery 115 with the tray 125 coupled with the battery 115. For example, the battery 115 can be coupled with the tray 125 via one or more fasteners, adhesive, or some other attachment mechanism. The battery energy storage system 100 can include multiple battery trays 125 to support multiple batteries 115. For example, the battery energy storage system 100 can include more than one battery tray 125 to support more than one battery 115.

The battery energy storage system 100 can include the tray 125 with the tray 125 including a first member 130 and a second member 135. For example, the tray 125 can be formed by the first member 130 and the second member 135 coupled with a battery 115. The tray 125 can include the first member 130 separate from the second member 135 such that the first member 130 is not integrated with (e.g., directly joined to, forming part of the same whole, or otherwise integrally formed) with the second member 135. The tray 125 can include the first member 130 coupled with or integrally formed with the second member 135. For example, the tray 125 can include the first member 130 directly coupled with the second member 135 such that the tray 125 is a single member. The tray 125 can include the first member 130 coupled with the second member 135 via some intervening components. For example, a central member can be positioned between the first member 130 and the second member 135, with the first member 130 and the second member 135 coupled with the central portion.

Figure 4:
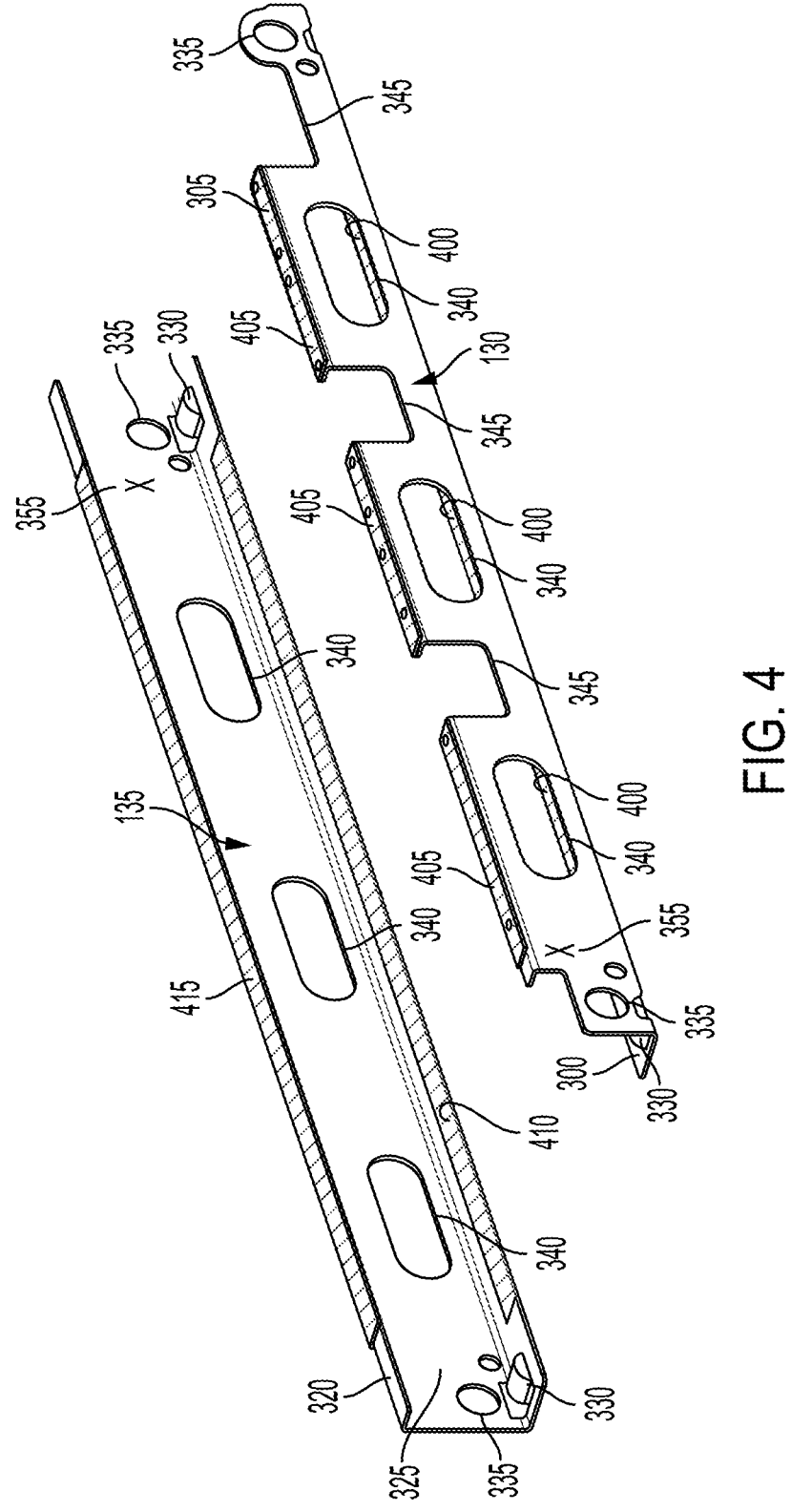
FIG. 4 depicts an example battery tray for a battery energy storage system, in accordance with some aspects.

As depicted in FIGS. 3-5, among others, the battery energy storage system 100 can include the first member 130 of the tray 125 including a first lower portion 300 and a first upper portion 305. For example, the first member 130 can include the first lower portion 300 and the first upper portion 305 extending from a first side portion 310. The first member 130 can include a C-shaped cross-sectional form factor, a J-shaped cross-sectional form factor, or some other cross-sectional form factor. For example, the first upper portion 305 can extend parallel or substantially parallel (e.g., ±15° from parallel) to the first lower portion 300. In other examples, the first upper portion 305 and the first lower portion 300 can be non-parallel. The first side portion 310 can be perpendicular or substantially perpendicular to the first upper portion 305 and the first lower portion 300. The first upper portion 305 can extend from the first side portion 310 at a distance that is similar to or different than a distance at which the first lower portion 300 extends from the first side portion 310. For example, the first lower portion 300 can extend from the first side portion 310 at a first distance that is greater than a second distance at which the first upper portion 305 extends from the first side portion 310. The first upper portion 305, the first side portion 310, and the first lower portion 300 can include a cross-sectional thickness that is the same as or different than a cross-sectional thickness one or more of the first side portion 310, the first lower portion 300, or the first upper portion 305. The first upper portion 305 can define at least one aperture or can include at least one fastener (e.g., a bolt, screw, rivet, or other fastener). For example, the first upper portion 305 can include at least one aperture to receive a fastener (e.g., bolt, screw, rivet, or other fastener) to secure or couple the battery 115 with the first upper portion 305. The first upper portion 305 can include at least one fastener protruding from the second upper portion 320, the fastener to be received by an aperture defined by the mounting flange 365 of the battery 115 to couple the battery 115 with the second upper portion 320, as discussed below.

The battery energy storage system 100 can include the second member 135 of the tray 125 including a second lower portion 315 and a second upper portion 320. The second member 135 can include a cross-sectional shape that is a mirror image or substantially a mirror image (e.g., ±75% similar) to a cross-sectional shape of the first member 130. For example, the second member 135 can include the second lower portion 315 and the second upper portion 320 extending from a second side portion 325. The second member 135 can include a C-shaped cross-sectional form factor, a J-shaped cross-sectional form factor, or some other cross-sectional form factor. For example, the second upper portion 320 can extend parallel or substantially parallel (e.g., ±15° from parallel) to the second lower portion 315. In other examples, the second upper portion 320 and the second lower portion 315 can be non-parallel. The second side portion 325 can be perpendicular or substantially perpendicular to the second upper portion 320 and the second lower portion 315. The second upper portion 320 can extend from the second side portion 325 at a distance that is similar to or different than a distance at which the second lower portion 315 extends from the second side portion 325. For example, the second lower portion 315 can extend from the second side portion 325 at a third distance that is greater than a fourth distance at which the second upper portion 320 extends from the second side portion 325. The second upper portion 320, the second side portion 325, and the second lower portion 315 can include a cross-sectional thickness that is the same as or different than a cross-sectional thickness one or more of the second side portion 325, the second lower portion 315, or the second upper portion 320. The second upper portion 320 can define at least one aperture or can include at least one fastener (e.g., a bolt, screw, rivet, or other fastener). For example, the second upper portion 320 can include at least one aperture to receive a fastener (e.g., bolt, screw, rivet, or other fastener) to secure or couple the battery 115 with the second upper portion 320. The second upper portion 320 can include at least one fastener protruding from the second upper portion 320, the fastener to be received by an aperture defined by the mounting flange 365 of the battery 115 to couple the battery 115 with the second upper portion 320, as discussed below.

The battery energy storage system 100 can include the first lower portion 300 of the first member 130 to support the battery 115. For example, the first lower portion 300 can support a bottom of the battery 115 with the battery 115 coupled with the tray 125. The first lower portion 300 can extend from the first side portion 310 underneath the battery 115 such that a weight of the battery 115 can be supported by the first lower portion 300 with the battery 115 coupled with the tray 125. For example, the first lower portion 300 can be a ledge, surface, or plate upon which a first portion of the battery 115 can be supported (e.g., contact, rest, be placed). The first lower portion 300 of the first member 130 can directly contact the battery 115 with the battery 115 coupled with the tray 125 such that an outer surface of the battery 115 directly contacts the first lower portion 300 without any other components therebetween. The first lower portion 300 of the first member 130 can indirectly contact the battery 115 with the battery 115 coupled with the tray 125 such that at least one intervening component (e.g., a first insulative element 400) is positioned between the battery 115 and the first lower portion 300. The first lower portion 300 can extend under the battery 115 for a distance such that the battery 115 is supported by an area of the first lower portion 300 to distribute a weight of the battery 115 over the area of the first lower portion 300.

The battery energy storage system 100 can include the first lower portion 300 of the first member 130 to support the battery 115 with a first insulative element 400 positioned between the battery 115 and the first lower portion 300. For example, the first insulative element 400 can be positioned between the battery 115 and the first lower portion 300 such that the battery 115 does not directly contact the first lower portion 300. Rather, the battery 115 can contact the first insulative element 400, and the first insulative element 400 can contact the first lower portion 300 of the first member 130. The first insulative element 400 can be or include an electrically insulative material or chemical composition. For example, the first insulative element 400 can be or include an EPDM (ethylene propylene diene monomer) rubber material, other rubber materials, a ceramic material, a glass material, a polymeric or plastic material, a glass material, or some other material. The first insulative element 400 can be or include an electrically insulative material electrically insulate the battery 115 from the first lower portion 300 of the first member 130. The first insulative element 400 can electrically isolate the battery 115 from the first member 130. For example, the electricity cannot pass or flow from the battery 115 to the first member 130 or from the first member 130 to the battery 115 with the first insulative element 400 positioned between the battery 115 and the first lower portion 300.

The first insulative element 400 can be coupled with the first lower portion 300. For example, the first insulative element 400 can be fastened to, adhered to (e.g., with an adhesive), or otherwise joined with the first lower portion 300. The first insulative element 400 can be integrated with the first lower portion 300. The first lower portion 300 itself can be the first insulative element 400. The first insulative element 400 can span an area of the first lower portion 300 such that no portion of the battery 115 contacts the first lower portion 300, but rather the battery 115 contacts only the first insulative element 400. For example, the first insulative element 400 can span an entire length or substantially an entire length (e.g., ±75% of the length) of the first lower portion 300. The first insulative element 400 can span substantially an entire length of multiple segments of the first lower portion 300 with the first lower portion 300 being discontinuous (e.g., including multiple discrete segments).

The battery energy storage system 100 can include the second lower portion 315 of the second member 135 to support the battery 115. For example, the second lower portion 315 can support a bottom of the battery 115 with the battery 115 coupled with the tray 125. The second lower portion 315 can extend from the second side portion 325 underneath the battery 115 such that a weight of the battery 115 can be supported by the second lower portion 315 with the battery 115 coupled with the tray 125. For example, the second lower portion 315 can be a ledge, surface, or plate upon which the battery 115 can be supported (e.g., contact, rest, be placed). The second lower portion 315 of the second member 135 can directly contact the battery 115 with the battery 115 coupled with the tray 125 such that an outer surface of the battery 115 directly contacts the second lower portion 315 without any other components therebetween. The second lower portion 315 of the second member 135 can indirectly contact the battery 115 with the battery 115 coupled with the tray 125 such that at least one intervening component (e.g., a third insulative element 410) is positioned between the battery 115 and the second lower portion 315. The second lower portion 315 can extend under the battery 115 for a distance such that the battery 115 is supported by an area of the second lower portion 315 to distribute a weight of the battery 115 over the area of the second lower portion 315.

The battery energy storage system 100 can include the second lower portion 315 of the second member 135 to support the battery 115 with a third insulative element 410 positioned between the battery 115 and the second lower portion 315. For example, the third insulative element 410 can be positioned between the battery 115 and the second lower portion 315 such that the battery 115 does not directly contact the second lower portion 315. Rather, the battery 115 can contact the third insulative element 410, and the third insulative element 410 can contact the second lower portion 315 of the second member 135. The third insulative element 410 can be or include an electrically insulative material or chemical composition. For example, the third insulative element 410 can be or include an EPDM (ethylene propylene diene monomer) rubber material, other rubber materials, a ceramic material, a glass material, a polymeric or plastic material, a glass material, or some other material. The third insulative element 410 can be or include an electrically insulative material electrically insulate the battery 115 from the second lower portion 315 of the second member 135. The third insulative element 410 can electrically isolate the battery 115 from the second member 135. For example, the electricity cannot pass or flow from the battery 115 to the second member 135 or from the second member 135 to the battery 115 with the third insulative element 410 positioned between the battery 115 and the second lower portion 315.

The third insulative element 410 can be coupled with the first upper portion 305. For example, the third insulative element 410 can be fastened to, adhered to (e.g., with an adhesive), or otherwise joined with the first upper portion 305. The third insulative element 410 can be integrated with the first upper portion 305. The second lower portion 315 itself can be the third insulative element 410. The third insulative element 410 can span an area of the second lower portion 315 such that no portion of the battery 115 contacts the second lower portion 315, but rather the battery 115 contacts only the third insulative element 410. For example, the third insulative element 410 can span an entire length or substantially an entire length (e.g., ±75% of the length) of the second lower portion 315. The third insulative element 410 can span substantially an entire length of multiple segments of the second lower portion 315 with the second lower portion 315 being discontinuous (e.g., including multiple discrete segments).

The battery energy storage system 100 can include the battery 115 coupled with the first upper portion 305 of the first member 130. For example, the first upper portion 305 can be coupled with the mounting flange 365 of the battery 115. The mounting flange 365 can extend from the top of the battery 115 to one side of the battery such that the mounting flange 365 extends away from the battery 115. The first upper portion 305 can extend from the first side portion 310 towards the battery 115 with the battery 115 supported by the first lower portion 300 of the first member 130. The mounting flange 365 can define at least one aperture to receive a fastener. The mounting flange 365 of the battery 115 can include at least one fastener to be received by another aperture (e.g., an aperture defined by the first upper portion 305). The first upper portion 305 can define at least one aperture to receive a fastener. The first upper portion 305 can include at least one aperture to be received by another aperture (e.g., an aperture defined by the mounting flange 365). For example, the first upper portion 305 can define multiple apertures that correspond with multiple apertures defined by the mounting flange 365. At least one of the apertures of the mounting flange 365 can align with at least one aperture of the first upper portion 305. A fastener 140 can be received by the aperture of the mounting flange 365 and the aperture of the first upper portion 305. For example, a fastener 140 can be inserted into (e.g., have a shank extending through, be threaded into) at least one aperture of the mounting flange 365 and also inserted into at least one aperture of the first upper portion 305. A fastening element (e.g., nut) can be secured to the fastener 140 to secure the mounting flange 365 to the first upper portion 305. For example, the mounting flange 365 can include multiple apertures (e.g., five to twenty) that correspond (e.g., are coaxial with) with the same or a similar (e.g., ±75%) amount of apertures of the first upper portion 305.

The battery energy storage system 100 can include the first upper portion 305 coupled with the mounting flange 365 with a second insulative element 405 positioned between the first upper portion 305 and the mounting flange 365. For example, the second insulative element 405 can be positioned between the mounting flange 365 of the battery 115 and the first upper portion 305 such that the mounting flange 365 does not directly contact the first upper portion 305. Rather, the mounting flange 365 can contact the second insulative element 405, and the second insulative element 405 can contact the first upper portion 305 of the first member 130. The second insulative element 405 can be or include an electrically insulative material or chemical composition. For example, the second insulative element 405 can be or include an EPDM (ethylene propylene diene monomer) rubber material, other rubber materials, a ceramic material, a glass material, a polymeric or plastic material, a glass material, or some other material. The second insulative element 405 can be or include an electrically insulative material electrically insulate the mounting flange 365 and the battery 115 from the first upper portion 305 of the first member 130. The second insulative element 405 can electrically isolate the battery 115 from the first member 130. For example, electricity cannot pass or flow from the battery 115 or mounting flange 365 to the first member 130 or from the first member 130 to the battery 115 or mounting flange 365 with the second insulative element 405 positioned between the mounting flange 365 and the first upper portion 305.

The second insulative element 405 can be coupled with the first upper portion 305. For example, the second insulative element 405 can be fastened to, adhered to (e.g., with an adhesive), or otherwise joined with the first upper portion 305. The second insulative element 405 can be integrated with the first upper portion 305. The first upper portion 305 itself can be the second insulative element 405. The second insulative element 405 can span an area of the first upper portion 305 such that no portion of the battery 115 contacts the first upper portion 305, but rather the battery 115 contacts only the second insulative element 405. For example, the second insulative element 405 can span an entire length or substantially an entire length (e.g., ±75% of the length) of the first upper portion 305. The second insulative element 405 can span substantially an entire length of multiple segments of the first upper portion 305 with the first upper portion 305 being discontinuous (e.g., including multiple discrete segments).

The battery energy storage system 100 can include the first upper portion 305 defining an aperture to receive a fastener 140. For example, the first upper portion 305 can define an aperture that corresponds with an aperture of the mounting flange 365. The aperture of the first upper portion 305 and the aperture of the mounting flange 365 can receive the fastener 140 to couple the mounting flange 365 with the first upper portion. The fastener 140 can include or can be coupled with an insulative washer 500. The insulative washer 500 can be positioned between a head 505 of the fastener 140 and the mounting flange 365 with the fastener 140 coupling the mounting flange 365 with the first upper portion 305. The insulative washer 500 can be or include an electrically insulative material (e.g., EPDM rubber, another rubber material, a ceramic material, a glass material, a polymeric or plastic material, a glass material, or some other material). For example, the fastener 140 can be electrically isolated from the battery 115 such that no electricity can pass or flow between the battery 115 and the fastener 140 with the insulative washer 500 positioned therebetween. The insulative washer 500 can electrically insulate the battery 115 from the first upper portion 305 to electrically isolate the battery 115 from the first member 130.

The battery energy storage system 100 can include the battery 115 coupled with the second upper portion 320 of the second member 135. For example, the first upper portion 305 can be coupled with the mounting flange 365 of the battery 115. The mounting flange 365 can extend from the top of the battery 115 to one side of the battery such that the mounting flange 365 extends away from the battery 115. The second upper portion 320 can extend from the second side portion 325 towards the battery 115 with the battery 115 supported by the second lower portion 315 of the second member 135. The mounting flange 365 can define at least one aperture to receive a fastener. The mounting flange 365 of the battery 115 can include at least one fastener to be received by another aperture (e.g., an aperture defined by the second upper portion 320). The second upper portion 320 can define at least one aperture to receive a fastener. The second upper portion 320 can include at least one aperture to be received by another aperture (e.g., an aperture defined by the mounting flange 365). For example, the second upper portion 320 can define multiple apertures that correspond with multiple apertures defined by the mounting flange 365. At least one of the apertures of the mounting flange 365 can align with at least one aperture of the second upper portion 320. A fastener 140 can be received by the aperture of the mounting flange 365 and the aperture of the second upper portion 320. For example, a fastener 140 can be inserted into (e.g., have a shank extending through, be threaded into) at least one aperture of the mounting flange 365 and also inserted into at least one aperture of the second upper portion 320. A fastening element (e.g., nut) can be secured to the fastener 140 to secure the mounting flange 365 to the first upper portion 305. For example, the mounting flange 365 can include multiple apertures (e.g., five to twenty) that correspond (e.g., are coaxial with) with the same or a similar (e.g., ±75%) amount of apertures of second upper portion 320.

The battery energy storage system 100 can include the second upper portion 320 coupled with the mounting flange 365 with a fourth insulative element 415 positioned between second upper portion 320 and the mounting flange 365. For example, the fourth insulative element 415 can be positioned between the mounting flange 365 of the battery 115 and second upper portion 320 such that the mounting flange 365 does not directly contact second upper portion 320. Rather, the mounting flange 365 can contact the fourth insulative element 415, and the fourth insulative element 415 can contact second upper portion 320 of the second member 135. The fourth insulative element 415 can be or include an electrically insulative material or chemical composition. For example, the fourth insulative element 415 can be or include an EPDM (ethylene propylene diene monomer) rubber material, other rubber materials, a ceramic material, a glass material, a polymeric or plastic material, a glass material, or some other material. The fourth insulative element 415 can be or include an electrically insulative material electrically insulate the mounting flange 365 and the battery 115 from second upper portion 320 of the second member 135. The fourth insulative element 415 can electrically isolate the battery 115 from the second member 135. For example, electricity cannot pass or flow from the battery 115 or mounting flange 365 to the second member 135 or from the second member 135 to the battery 115 or mounting flange 365 with the fourth insulative element 415 positioned between the mounting flange 365 and second upper portion 320.

The fourth insulative element 415 can be coupled with the second upper portion 320. For example, the fourth insulative element 415 can be fastened to, adhered to (e.g., with an adhesive), or otherwise joined with the second upper portion 320. The fourth insulative element 415 can be integrated with the second upper portion 320. The second upper portion 320 itself can be the fourth insulative element 415. The fourth insulative element 415 can span an area of the second upper portion 320 such that no portion of the battery 115 contacts the second upper portion 320, but rather the battery 115 contacts only the fourth insulative element 415. For example, the fourth insulative element 415 can span an entire length or substantially an entire length (e.g., ±75% of the length) of the second upper portion 320. The fourth insulative element 415 can span substantially an entire length of multiple segments of the second upper portion 320 with the second upper portion 320 being discontinuous (e.g., including multiple discrete segments).

The battery energy storage system 100 can include the second upper portion 320 defining an aperture to receive a fastener 140. For example, the second upper portion 320 can define an aperture that corresponds with an aperture of the mounting flange 365. The aperture of the second upper portion 320 and the aperture of the mounting flange 365 can receive the fastener 140 to couple the mounting flange 365 with the second upper portion 320. The fastener 140 can include or can be coupled with an insulative washer 500. The insulative washer 500 can be positioned between a head 505 of the fastener 140 and the mounting flange 365 with the fastener 140 coupling the mounting flange 365 with the second upper portion 320. The insulative washer 500 can be or include an electrically insulative material (e.g., EPDM rubber, another rubber material, a ceramic material, a glass material, a polymeric or plastic material, a glass material, or some other material). For example, the fastener 140 can be electrically isolated from the battery 115 such that no electricity can pass or flow between the battery 115 and the fastener 140 with the insulative washer 500 positioned therebetween. The insulative washer 500 can electrically insulate the battery 115 from the second upper portion 320 to electrically isolate the battery 115 from the second member 135.

The battery energy storage system 100 can include the first member 130 and the second member 135 to interact with the frame 120 of the battery energy storage system 100. For example, the first member 130 and the second member 135 can be supported by the surface 235 of a pair of rails 230 with the rails 230 coupled with the frame 120. The rails 230 can support the first member 130 and the second member 135 with the first member 130 and the second member 135 coupled with the battery 115. The first member 130 can include at least one roller 330 to facilitate a movement of the first member 130 with respect to the frame 120. For example, the first lower portion 300 can be rotatably coupled with a roller 330. The roller 330 can extend beneath a bottom surface of the first lower portion 300 such that the roller 330 contacts the surface 235 of the rail 230 rather than the first lower portion 300 itself. The roller 330 can be or include at least one bearing (e.g., pin, ball bearing, pillow block, or other bearing device) to facilitate a rotational movement of the roller 330 with respect to the first lower portion 300. As depicted in FIGS. 3 and 4, the first member 130 can include a first roller 330 and a second roller 330, with the first roller positioned at or proximate to (e.g., within two centimeters of, within five centimeters of, within ten centimeters of, or within some other distance of) one end of the first member 130 and the second roller 330 positioned at or proximate to (e.g., within two centimeters of, within five centimeters of, within ten centimeters of, or within some other distance of) another end of the first member 130. The roller 330 can be positioned along the first lower portion 300 such that the roller 330 contacts the surface 235 with the first member 130 supported by the surface 235. For example, the roller 330 can have a width that is entirely supported by (e.g., contacts) the surface 235.

The second member 135 can include at least one roller 330 to facilitate a movement of the second member 135 with respect to the frame 120. For example, the first lower portion 300 can be rotatably coupled with a roller 330. The roller 330 can extend beneath a bottom surface of the second lower portion 315 such that the roller 330 contacts the surface 235 of the rail 230 rather than the second lower portion 315 itself. The roller 330 can be or include at least one bearing (e.g., pin, ball bearing, pillow block, or other bearing device) to facilitate a rotational movement of the roller 330 with respect to the second lower portion 315. As depicted in FIGS. 3 and 4, the second member 135 can include a first roller 330 and a second roller 330, with the first roller positioned at or proximate to (e.g., within two centimeters of, within five centimeters of, within ten centimeters of, or within some other distance of) one end of the second member 135 and the second roller 330 positioned at or proximate to (e.g., within two centimeters of, within five centimeters of, within ten centimeters of, or within some other distance of) another end of the second member 135. The roller 330 can be positioned along the first lower portion 300 such that the roller 330 contacts the surface 235 with the first member 130 supported by the surface 235. For example, the roller 330 can have a width that is entirely supported by (e.g., contacts) the surface 235.

The battery energy storage system 100 can include the first insulative element 400, the second insulative element 405, the third insulative element 410, and the fourth insulative element 415 to electrically isolate the battery 115 from the frame 120 of the battery energy storage system 100. For example, as discussed above, the battery 115 can be electrically isolated from the first member 130 with the first insulative element 400 positioned between the battery 115 and the first lower portion 300 and the second insulative element 405 positioned between the mounting flange 365 of the battery 115 and the first upper portion 305. The battery 115 can be electrically isolated from the second member 135 with the third insulative element 410 positioned between the battery 115 and the second lower portion 315 and the fourth insulative element 415 positioned between the battery 115 and the second upper portion 320. Because the battery 115 can be electrically isolated from the first member 130 and the second member 135, the battery 115 can also be electrically isolated from the rails 230 and the frame 120 of the battery energy storage system 100 with the first insulative element 400 positioned between the battery 115 and the first lower portion 300, the second insulative element 405 positioned between the mounting flange 365 of the battery 115 and the first upper portion 305, the third insulative element 410 positioned between the battery 115, and the second lower portion 315 and the fourth insulative element 415 positioned between the battery 115 and the second upper portion 320.

As depicted in FIGS. 3 and 4, among others, the first member 130 or the second member 135 can include at least one hoisting aperture 335, at least one grasping device 340, at least one opening 345, and at least one identifier 355. For example, the first member 130 can include at least one hoisting aperture 335 formed in at least one of the first lower portion 300, the first side portion 310, or the first upper portion 305. The hoisting aperture 335 can be an aperture defined by the first member 130 and configured to receive a hook, prong, or finger of a hoisting mechanism (e.g., an overhead crane, a mechanical hoist, or other device). The hoisting aperture 335 can provide a location for a hoisting mechanism to temporarily couple with the tray 125 and battery 115 to move the tray 125 and battery 115 without inadvertently causing damage to the tray 125, the battery 115, or otherwise.

The first member 130 or the second member 135 can include the grasping device 340 to facilitate a movement of the tray 125 or the battery 115. For example, the grasping device 340 can be an aperture or cutout formed in the first side portion 310 of the first member 130 to allow a hand of an operator (e.g., a person, a user, or other individual) to grasp the tray 125. The grasping member 340 can be a handle or other member protruding from the first side portion 310 of the first member 130 to provide a grasping location for a user. The first member 130 or the second member 135 can include multiple grasping devices 340 positioned at various positions on the first member 130 or the second member 135 (e.g., on the first lower portion 300, the first upper portion 305, or the first side portion 310) so that a user can grasp the tray 125 to facilitate a movement of the tray 125. For example, an operator may grasp one or more grasping devices 340 to slide or translate the tray 125 and battery 115 into or out of the cavity 155 of the cabinet 105.

The first member 130 or the second member 135 can include at least one opening 345. For example, the first member 130 can include at least one opening 345 to provide access to the connector 350 of the battery 115 with the battery 115 coupled with the first member 130 of the tray 125. The first member 130 can include at least one opening 345 corresponding to each connector 350 of the battery 115. For example, the battery 115 can include two or more connectors 350, and the first member 130 can include two or more openings 345 such that each connector 350 can be accessed with the battery 115 coupled with the first member 130. The opening 345 can be an aperture or a cutout of one or more of the first side portion 310, the first lower portion 300, or the first upper portion 305. The opening 345 can provide access for an electrical wire or wiring harness of the battery energy storage system 100 to be coupled with the connector 350.

The first member 130 or the second member 135 can include at least one identifier 355. For example, the first member 130 and the second member 135 can each include a visual identifier, RFID transmitter, or other electronic identifier formed in or coupled to the first member 130 and the second member 135, respectively. The identifier can be a 2D barcode, a QR code, or some other visual identifier. The identifier 355 can identify a battery type of the battery 115 coupled with the tray 125. The identifier 355 can identify a particular iteration of the first member 130 (e.g., a particular first member 130 having a dimension or feature to suit a particular battery type), a particular iteration of the battery tray 125 (e.g., a particular first member 130 or second member 135 having particular a dimension or feature to suit a particular battery type), a material composition of the first member 130 or the second member 135, or some other parameter. The battery energy storage system 100 can include multiple batteries 115 coupled with multiple trays 125, where at least one of the trays 125 can be different than at least one of the other trays 125. For example, the identifier 355 can distinguish one tray 125 or associated battery 115 from another tray 125 or associated battery 115.

Figure 6:
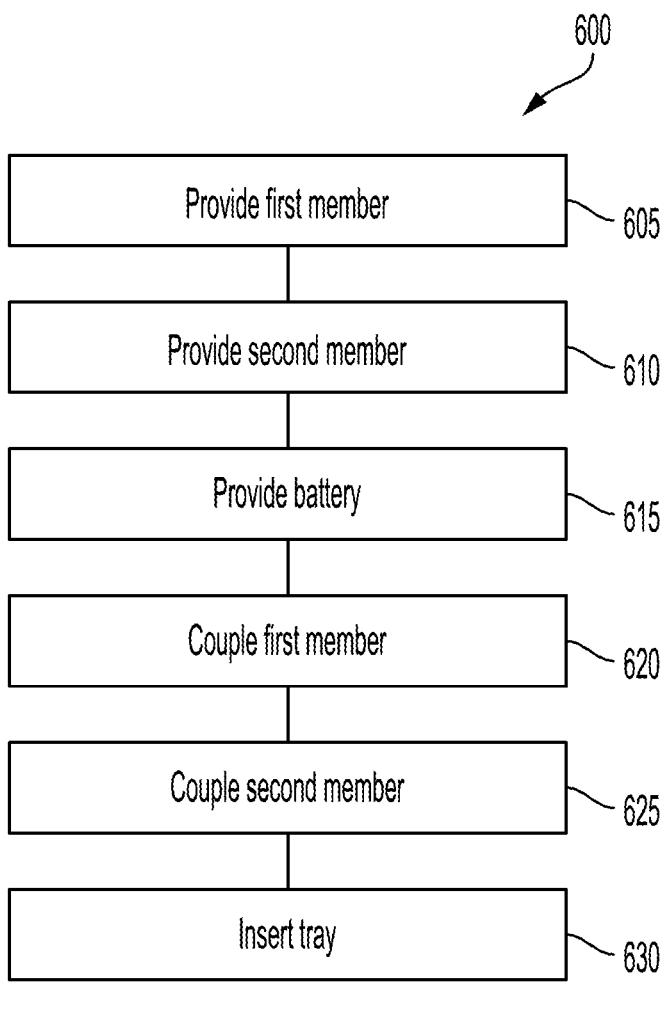
FIG. 6 is a flow chart of an example method, in accordance with some aspects.

As depicted in FIG. 6, a method 600 is shown. The method 600 can be performed by an operator (e.g., field technician, a user, an individual, or some other person). The method 600 can include at least one of ACTS 605-630. The ACTS 605-630 can be performed in an order as depicted in FIG. 6 or in some other order.

The method 600 can include providing a first member at ACT 605. For example, the method 600 can include providing the first member 130 at ACT 605. The first member 130 can include a first lower portion 300, a first upper portion 305, and a first side portion 310. The first upper portion 305 and the first lower portion 300 can extend perpendicularly or substantially perpendicularly (e.g., ±15° from perpendicular) from the first side portion 310. The first lower portion 300 can support a battery 115. For example, the first lower portion 300 can support a bottom of a battery 115 with the first member 130 supporting the battery 115. The first upper portion 305 can couple with a mounting flange 365 of the battery 115 with the battery 115 supported by the first member 130. The first lower portion 300 can be or include a first insulative element 400. The first upper portion 305 can be or include a second insulative element 405. The first insulative element 400 or the second insulative element 405 can be or include an electrically insulative material such as EPDM rubber or some other material.

The method 600 can include providing a second member at ACT 610. For example, the method 600 can include providing the second member 135 at ACT 610. The second member 135 can include a second lower portion 315, a second upper portion 320, and a second side portion 325. The second upper portion 320 and the second lower portion 315 can extend perpendicularly or substantially perpendicularly (e.g., ±15° from perpendicular) from the second side portion 325. The second lower portion 315 can support a battery 115. For example, the second lower portion 315 can support a bottom of a battery 115 with the second member 135 supporting the battery 115. The second upper portion 320 can couple with a mounting flange 365 of the battery 115 with the battery 115 supported by the second member 135. The second lower portion 315 can be or include a third insulative element 410. The second upper portion 320 can be or include a fourth insulative element 415. The third insulative element 410 or the fourth insulative element 415 can be or include an electrically insulative material such as EPDM rubber or some other material.

The method 600 can include providing a battery at ACT 615. For example, the method 600 can include providing the battery 115 at ACT 615. The battery 115 can be a battery cell, battery module, or battery pack. The battery 115 can be a rechargeable battery from an electric vehicle. For example, the battery 115 can have a first life application as a battery for an electric vehicle (e.g., an electrically-powered car, truck, bus, construction machinery, or other vehicle) and a second life application for a battery energy storage system, such as the battery energy storage system 100. The battery 115 can include at least one mounting flange 365. For example, the battery 115 can include a first mounting flange 365 and a second mounting flange 365 to couple the battery with a chassis of an electric vehicle or a battery tray (e.g., the tray 125) of a battery energy storage system 100. The battery 115 can include a lithium-based chemistry, a nickel-based chemistry, or some other chemistry.

The method 600 can include coupling the first member at ACT 620. For example, the method 600 can include coupling the first member 130 provided at ACT 605 with the battery 115 provided at ACT 615. The first lower portion 300 can support the battery 115 with the first member 130 coupled with the battery 115. The first insulative element 400 can be positioned between the battery 115 and the first lower portion 300 with battery 115 supported by the first lower portion 300 to electrically isolate the battery 115 from the first lower portion 300. The first upper portion 305 can couple with the first mounting flange 365. The second insulative element 405 can be positioned between the first upper portion 305 and the first mounting flange 365 with the first upper portion 305 coupled with the first mounting flange 365 to electrically isolate the battery from the first upper portion 305. The first member 130 can include a first upper portion 305 defining at least one aperture. The first mounting flange 365 of the battery 115 can define at least one aperture. The aperture of the first upper portion 305 can correspond (e.g., align with, be coaxial with) the aperture of the first mounting flange 365. For example, the aperture of the first upper portion 305 and the aperture of the first mounting flange 365 can be aligned with the battery 115 supported by the first lower portion 300. The aperture of the first upper portion 305 and the aperture of the first mounting flange 365 can receive a fastener 140 to couple the first upper portion 305 with the first mounting flange 365. An insulative washer 500 can be positioned between a head 505 of the fastener 140 and the first mounting flange 165 to electrically isolate the battery 115 from the first upper portion 305.

The method 600 can include coupling the second member at ACT 625. For example, the method 600 can include coupling the second member 135 provided at ACT 610 with the battery 115 provided at ACT 615. The second lower portion 315 can support the battery 115 with the second member 135 coupled with the battery 115. The third insulative element 410 can be positioned between the battery 115 and the second lower portion 315 with battery 115 supported by the second lower portion 315 to electrically isolate the battery 115 from the second lower portion 315. The second upper portion 320 can couple with the second mounting flange 365. The fourth insulative element 415 can be positioned between the second upper portion 320 and the second mounting flange 365 with the second upper portion 320 coupled with the second mounting flange 365 to electrically isolate the battery from the second upper portion 320. The second member 135 can include the second upper portion 320 defining at least one aperture. The second mounting flange 365 of the battery 115 can define at least one aperture. The aperture of the second upper portion 320 can correspond (e.g., align with, be coaxial with) the aperture of the second mounting flange 365. For example, the aperture of the second upper portion 320 and the aperture of the second mounting flange 365 can be aligned with the battery 115 supported by the second lower portion 315. The aperture of the second upper portion 320 and the aperture of the second mounting flange 365 can receive a fastener 140 to couple the second upper portion 320 with the second mounting flange 365. An insulative washer 500 can be positioned between a head 505 of the fastener 140 and the second mounting flange 165 to electrically isolate the battery 115 from the second upper portion 320.

The method 600 can include inserting a tray at ACT 630. For example, the method 600 can include inserting the tray 125 including the first member 130 and the second member 135 coupled with the battery 115 into the frame 120 of a battery energy storage system 100. The frame 120 of the battery energy storage system 100 can include at least one rail 230 defining a surface 235. The surface 235 of the rail (or surfaces 235 of a pair of rails 230) can support the tray 125 within the frame 120 of the battery energy storage system 100. For example, the first member 130 or the second member 135 can include at least one roller 330 to rotate with respect to the first member 130 or the second member 135. The roller 330 can contact the surface 235 to translate (e.g., slide, insert, remove) the tray 125 with respect to the rail 230 and the frame 120. The battery 115 and the tray 125 can be positioned within the cavity 155 defined by the cabinet 105 of the battery energy storage system 100 with the tray 125 supported by the frame 120 of the battery energy storage system 100.

Figure 7:
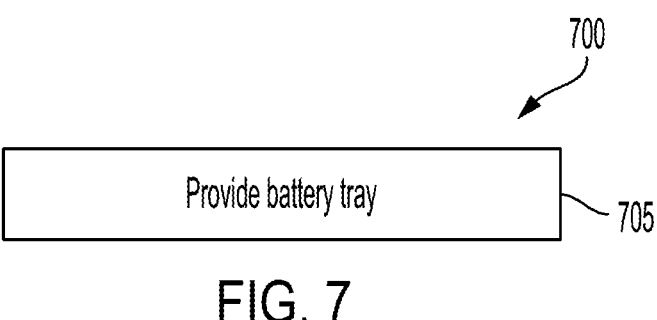
FIG. 7 is a flow chart of an example method, in accordance with some aspects.

FIG. 7, among others, depicts a method 700 of providing a battery tray at ACT 705. The battery tray can be the battery tray 125. The battery tray 125 can include a first member 130 and a second member 135. The first member 130 can include a first lower portion 300, a first side portion 310, and a first upper portion 305. The second member 135 can include a second lower portion 315, a second side portion 325, and a second upper portion 320. The first member 130 can include a first insulative element 400 coupled with or integrated with the first lower portion 300 and a second insulative element 405 coupled with or integrated with the first upper portion 305. The first insulative element 400 can be positioned between a battery 115 and the first lower portion 300 with the battery 115 supported by the first lower portion 300 to electrically isolate the battery 115 from the first lower portion 300. The second insulative element 405 can be positioned between a mounting flange 365 of the battery 115 and the first upper portion 305 with the mounting flange 365 coupled with the first upper portion 305 to electrically isolate the battery 115 from the first upper portion 305. The second member 135 can include a third insulative element 410 coupled with or integrated with the second lower portion 315 and a fourth insulative element 415 coupled with or integrated with the second upper portion 320. The third insulative element 410 can be positioned between a battery 115 and the second lower portion 315 with the battery 115 supported by the second lower portion 315 to electrically isolate the battery 115 from the second lower portion 315. The fourth insulative element 415 can be positioned between a mounting flange 365 of the battery 115 and the second upper portion 32—with the mounting flange 365 coupled with the second upper portion 320 to electrically isolate the battery 115 from the second upper portion 320.

Figure 8:
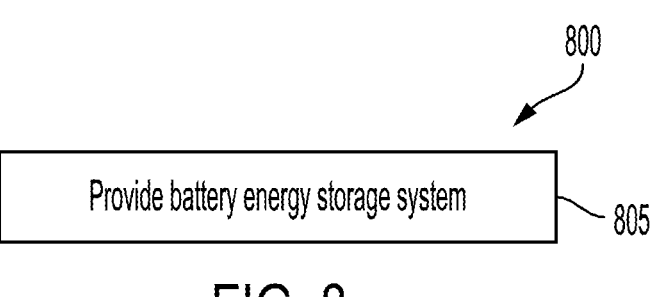
FIG. 8 is a flow chart of an example method, in accordance with some aspects.

FIG. 8, among others, depicts a method 800 of providing a battery energy storage system at ACT 805. The battery energy storage system 100 can include at least one battery 115 coupled with or supported by at least one battery tray 125. The battery tray 125 can include a first member 130 and a second member 135. The first member 130 can include a first lower portion 300, a first side portion 310, and a first upper portion 305. The second member 135 can include a second lower portion 315, a second side portion 325, and a second upper portion 320. The first member 130 can include a first insulative element 400 coupled with or integrated with the first lower portion 300 and a second insulative element 405 coupled with or integrated with the first upper portion 305. The first insulative element 400 can be positioned between a battery 115 and the first lower portion 300 with the battery 115 supported by the first lower portion 300 to electrically isolate the battery 115 from the first lower portion 300. The second insulative element 405 can be positioned between a mounting flange 365 of the battery 115 and the first upper portion 305 with the mounting flange 365 coupled with the first upper portion 305 to electrically isolate the battery 115 from the first upper portion 305. The second member 130 can include a third insulative element 410 coupled with or integrated with the second lower portion 315 and a fourth insulative element 415 coupled with or integrated with the second upper portion 320. The third insulative element 410 can be positioned between a battery 115 and the second lower portion 315 with the battery 115 supported by the second lower portion 315 to electrically isolate the battery 115 from the second lower portion 315. The fourth insulative element 415 can be positioned between a mounting flange 365 of the battery 115 and the second upper portion 32—with the mounting flange 365 coupled with the second upper portion 320 to electrically isolate the battery 115 from the second upper portion 320.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery tray, comprising:
a first member having a first lower portion and a first upper portion, the first lower portion to support a battery with a first insulative element positioned between the battery and an upper surface of the first lower portion, the first upper portion to couple with the battery with a second insulative element positioned between the battery and an upper surface of the first upper portion; and
a second member having a second lower portion and a second upper portion, the second lower portion to support the battery with a third insulative element positioned between the battery and an upper surface of the second lower portion, the second upper portion to couple with the battery with a fourth insulative element positioned between the battery and an upper surface of the second upper portion.

2. The battery tray of claim 1, comprising:
the first insulative element and the second insulative element to electrically isolate the battery from the first member; and
the third insulative element and the fourth insulative element to electrically isolate the battery from the second member.

3. The battery tray of claim 1, comprising:
the first member and the second member to interact with a frame of a battery energy storage system; and
the first insulative element, the second insulative element, the third insulative element, and the fourth insulative element to electrically isolate the battery from the frame of the battery energy storage system.

4. The battery tray of claim 1, comprising:
the first upper portion defining an aperture to receive a first fastener, the first fastener including an insulative washer to electrically isolate the battery from the first member; and
the second upper portion defining a second aperture to receive a second fastener, the second fastener to electrically isolate the battery from the second member.

5. The battery tray of claim 1, comprising:
the first member and the second member to interact with a frame of a battery energy storage system;
the first insulative element, the second insulative element, the third insulative element, and the fourth insulative element to electrically isolate the battery from the frame of the battery energy storage system;
the first upper portion defining an aperture to receive a first fastener, the first fastener including an insulative washer to electrically isolate the battery from the frame; and
the second upper portion defining a second aperture to receive a second fastener, the second fastener to electrically isolate the battery from the frame.

6. The battery tray of claim 1, comprising:
the first member including a side portion; and
the first upper portion extending a first distance from the side portion and the first lower portion extending a second distance from the side portion, the second distance greater than the first distance;
wherein the first upper portion couples with a mounting flange of the battery extending from the battery;
wherein the first lower portion supports the battery.

7. The battery tray of claim 1, comprising:

a first roller coupled with the first lower portion of the first member, the first roller to facilitate a movement of the battery coupled with the first member.

8. The battery tray of claim 1, comprising:

a first roller coupled with the first lower portion of the first member and a second roller coupled with the second lower portion of the second member, the first roller and the second roller to facilitate a movement of the battery coupled with the first member and the second member.

9. The battery tray of claim 1, comprising:

a first roller coupled with the first lower portion of the first member and a second roller coupled with the second lower portion of the second member, the first roller and the second roller to interact with a frame of a battery energy storage system and to facilitate a movement of the battery along the frame.

10. The battery tray of claim 1, comprising:

a first roller coupled with the first lower portion of the first member and a second roller coupled with the second lower portion of the second member, the first roller and the second roller to interact with a frame of a battery energy storage system and to facilitate a movement of the battery along the frame; and the first insulative element, the second insulative element, the third insulative element, and the fourth insulative element to electrically isolate the battery from the frame of the battery energy storage system.

11. The battery tray of claim 1, comprising:

a first roller coupled with the first lower portion of the first member and a second roller coupled with the second lower portion of the second member, the first roller and the second roller to interact with a frame of a battery energy storage system and to facilitate a movement of the battery along the frame;

the first insulative element, the second insulative element, the third insulative element, and the fourth insulative element to electrically isolate the battery from the frame of the battery energy storage system;

the first upper portion defining an aperture to receive a first fastener, the first fastener including an insulative washer to electrically isolate the battery from the frame; and the second upper portion defining a second aperture to receive a second fastener, the second fastener to electrically isolate the battery from the frame.

12. The battery tray of claim 1, comprising:

the first member defining an opening, wherein an electrical connector of the battery is accessible via the opening.

13. A battery energy storage system, comprising:

an enclosure defining an interior space;

a frame within the interior space of the enclosure and structured to receive a battery tray supporting a battery, the battery tray comprising:

a first member including a first lower portion and a first upper portion, the first member coupled with the battery;

a first insulative element positioned between an upper surface of the first upper portion of the first member and the battery to electrically isolate the battery from the frame;

a second member including a second lower portion and a second upper portion, the second member coupled with the battery; and a second insulative element positioned between an upper surface of the second upper portion of the second member and the battery to electrically isolate the battery from the frame.

14. The battery energy storage system of claim 13, comprising:

the first lower portion to support the battery with a third insulative element positioned between the first lower portion and the battery; and the second lower portion to support the battery with a fourth insulative element positioned between the second lower portion and the battery.

15. The battery energy storage system of claim 13, comprising:

the first member of the battery tray having a first side portion, the first lower portion extending a first distance from the first side portion to support a housing of the battery, the first upper portion extending a second distance from the first side portion to couple with a first mounting flange of the battery, the first mounting flange extending from the housing of the battery; and the second member of the battery tray having a second side portion, the second lower portion extending a third distance from the second side portion to support the housing of the battery, the second upper portion extending a fourth distance from the second side portion to couple with a second mounting flange of the battery, the second mounting flange extending from the housing of the battery.

16. The battery energy storage system of claim 13, comprising:

the first member of the battery tray having a first side portion, the first lower portion extending a first distance from the first side portion to support a housing of the battery, the first upper portion extending a second distance from the first side portion to couple with a first mounting flange of the battery, the first mounting flange extending from the housing of the battery;

the second member of the battery tray having a second side portion, the second lower portion extending a third distance from the second side portion to support the housing of the battery, the second upper portion extending a fourth distance from the second side portion to couple with a second mounting flange of the battery, the second mounting flange extending from the housing of the battery;

a first fastener to couple the first upper portion with the first mounting flange, the first fastener including an insulative washer to electrically isolate the battery from the frame; and a second fastener to couple the second upper portion with the second mounting flange, the second fastener including a second insulative washer to electrically isolate the battery from the frame.

17. The battery energy storage system of claim 13, comprising:

the first lower portion to support the battery with a third insulative element positioned between the first lower portion and the battery;

the second member of the battery tray having a second lower portion and a second upper portion, the second lower portion to support the battery with a fourth insulative element positioned between the second lower portion and the battery;

a first roller coupled with the first lower portion of the first member and a second roller coupled with the second lower portion of the second member, the first roller and the second roller to interact with the frame to facilitate a movement of the battery along the frame; and the first insulative element, the second insulative element, the third insulative element, and the fourth insulative element to electrically isolate the battery from the frame of the battery energy storage system.

18. A method, comprising:

providing a first member having a first lower portion and a first upper portion, the first member including a first electrically-insulative element;

providing a second member having a second lower portion and a second upper portion, the second member including a second electrically-insulative element;

coupling a battery with the first member with the first electrically-insulative element positioned between the battery and an upper surface of the first upper portion of the first member to electrically insulate the battery from the first member; and coupling the battery with the second member with the second electrically-insulative element positioned between the battery and an upper surface of the second upper portion of the second member.

19. The method of claim 18, comprising:

the first lower portion to support the battery with a third electrically-insulative element positioned between the first lower portion and the battery; and the second lower portion to support the battery with a fourth electrically-insulative element positioned between the second lower portion and the battery.

20. The method of claim 18, wherein the first member includes a first roller and the second member includes a second roller, the first roller and the second roller to interact with a frame of a battery energy storage system, the method comprising:

slidably inserting the first member, the second member, and the battery to the frame.

* * * * *